T. KUJIRAI.
FREQUENCY CONVERSION SYSTEM FOR ELECTRICAL OSCILLATIONS.
APPLICATION FILED MAR. 30, 1915.

Patented Feb. 13, 1917.
2 SHEETS—SHEET 1.

Inventor:
Tsunetaro Kujirai
per F. W. Waghorn
Attorney.

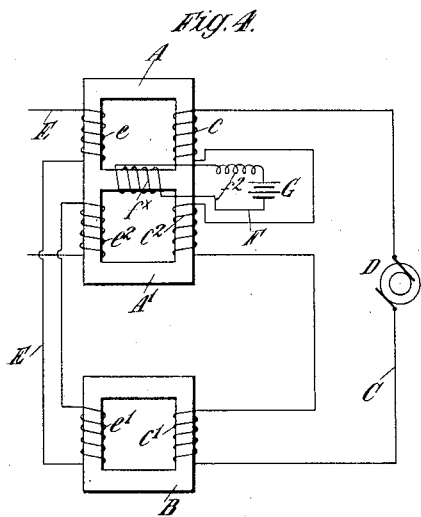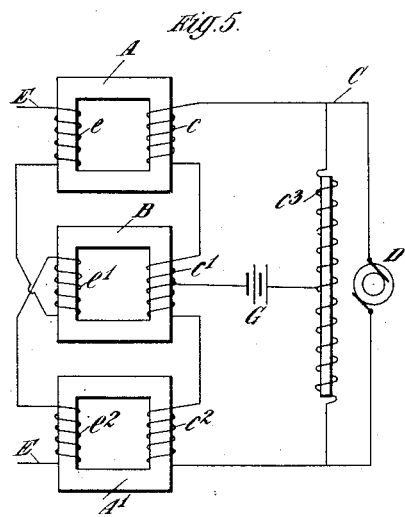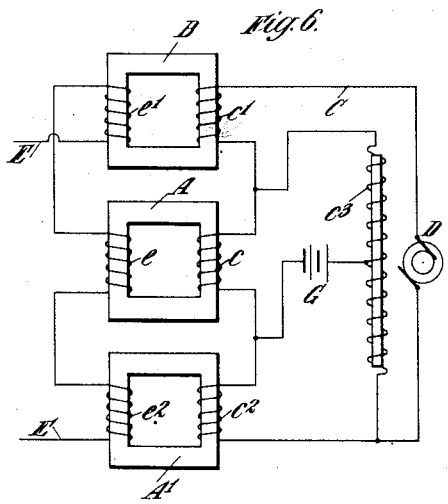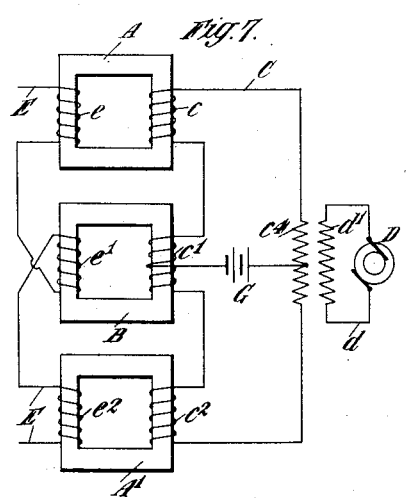

UNITED STATES PATENT OFFICE.

TSUNETARO KUJIRAI, OF HONGO, TOKYO, JAPAN.

FREQUENCY-CONVERSION SYSTEM FOR ELECTRICAL OSCILLATIONS.

1,215,820.   Specification of Letters Patent.   Patented Feb. 13, 1917.

Application filed March 30, 1915. Serial No. 18,065.

*To all whom it may concern:*

Be it known that I, TSUNETARO KUJIRAI, a subject of the Emperor of Japan, residing at 42 Higashikata Machi, Hongo, Tokyo, Japan, have invented certain new and useful Improvements in Frequency - Conversion Systems for Electrical Oscillations, of which the following is a specification.

This invention relates to frequency changing systems by means of which an alternating electric current is transformed into a current of three times the original frequency, or a multiple thereof, the invention being especially, though not exclusively, applicable to the production of high frequency oscillations for wireless telegraphy or telephony.

According to my invention primary and secondary circuits are connected to three transformer elements, two of which are oppositely polarized while the third is unpolarized, the secondary winding of the latter element being connected in opposition to the secondary windings of the two polarized elements.

In order that the said invention may be clearly understood and carried into effect the same will be more fully described with reference to the accompanying drawings, in which:—

Figure 1:
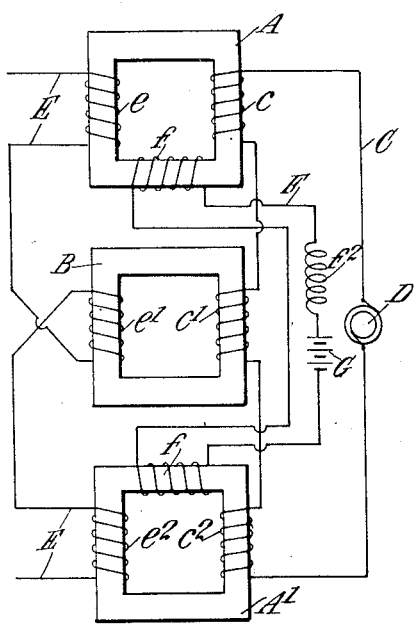

Figure 1 shows diagrammatically one arrangement of apparatus embodying my invention.

Figure 3:
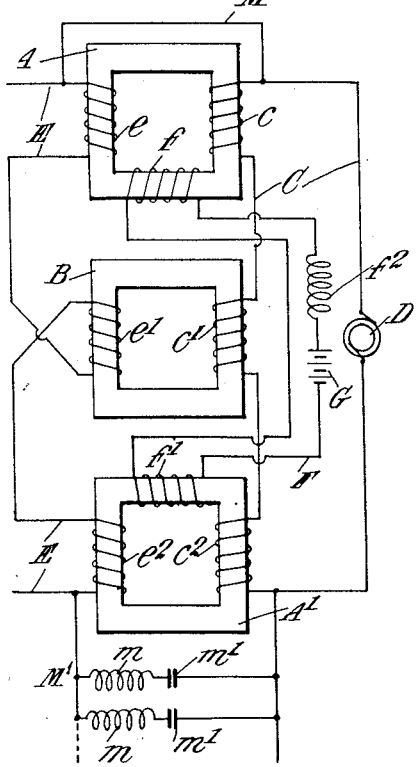
Figure 2:
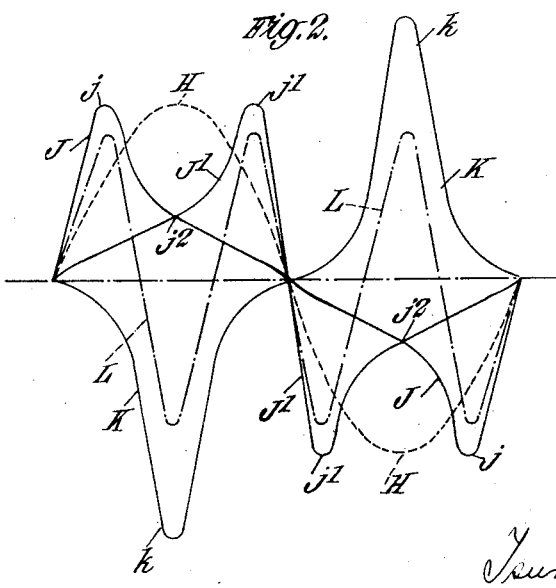

Fig. 2 is a diagram of wave forms, illustrating the manner in which the triple frequency E. M. F. is derived from the primary alternating E. M. F.;

Fig. 3 shows diagrammatically a further development of the apparatus shown in Fig. 1, and Figs. 4 to 7 are diagrams of four modifications of the apparatus.

A, A' are the two polarized transformer elements, shown in most of the figures as two independent transformers but a single transformer with branched cores would serve the same purpose as shown in Fig. 4. B is the unpolarized transformer element. C is the primary circuit with alternator D and transformer windings $c$, $c'$ and $c^2$ in series. E is the secondary circuit with windings $e$, $e'$ and $e^2$ in series. F is the direct current circuit with windings $f$, $f'$ for the transformers A, A' and with choking coil $f^2$ (Figs. 1 to 4). G is the generator for the circuit F.

The continuous current through the windings $f$, $f'$ of the transformers A, A' produces magnetizing force in opposite sense with respect to the primary windings $c$ and $c^2$ and the effect of this, as is well known, is to distort the wave form of the induced E. M. F. and to form comparatively sharp peaks displaced in phase forwardly or backwardly according to the sense of the polarization. The unpolarized transformer should be so designed as to attain such a degree of saturation by the primary current that the induced alternating E. M. F. has a peaked wave form; and the sharpness of the peak is increased by the fact that the primary coils are in series. Since the peak is symmetrical in phase it lies centrally between the two oppositely displaced wave peaks.

The two transformer elements A, A' in the modification shown in Fig. 4 are polarized in opposite senses by the single central coil $f^x$ on the central core from which the said two elements branch. The general arrangement of circuits and the resultant effect are the same as for the apparatus above described.

The special polarizing windings $f$, $f'$ or $f^x$ may in some cases be dispensed with and the direct current generator connected to the middle point of the primary coil $c'$ as shown in Fig. 5 or to a point between the two polarized coils $c$, $c^2$ (in the latter case these coils being adjacent) as shown in Fig. 6 and to the middle of a transformer or inductance coil $c^3$ in or across the circuit C. The alternator D may be placed in a separate primary circuit $d$ of which the circuit C is the secondary as shown in Fig. 7, where the coils $d'$ and $c^4$ are respectively the primary and secondary coils of the transformer. The direct current would branch in opposite directions through the two polarized coils $c$ and $c^2$ in each of the modifications shown in Figs. 5, 6 and 7, which are however identical in principle of operation with the other arrangements illustrated in Figs. 1, 3 and 4.

The wave diagram shown in Fig. 2 explains the formation of the triple periodicity wave. H represents the primary alternating E. M. F., of approximately sine wave form. J is the wave form of the E. M. F. across the terminals of the secondary winding $e$ and J' that of the E. M. F. across the terminals of the winding $e^2$. It will be seen that the peaks $j$ and $j'$ of these two waves are in the same sense but the upper peak $j$ is displaced to the left and the upper peak $j'$ to the right, the displacements at the lower side of the zero line being in opposite directions. The polarization of the transformers A and A' (regulated by varying the exciting direct current or the windings $f$, $f'$ or $f^x$) is adjusted so that the peaks $j$, $j'$ are separated by about a third of a cycle. The wave curve K belongs to the unpolarized transformer B and the peak $k$ is situated midway in phase between the peaks $j$, $j'$ but at the opposite side of the zero line. The amplitude of the wave K should usually be greater than that of the waves J, J' since the peak $k$ has to annul the sum of the E. M. F.'s of the waves J, J' at and around the crossing point $j^2$ and to provide excess E. M. F. sufficient to form a crest of the wave L of triple periodicity, the wave curve L showing the resultant E. M. F. at the secondary terminals due to the three coils $e$, $e'$ and $e^2$. It will be seen that the crests of the wave L correspond to the peaks $j$, $j'$ and $k$ so that each primary wave is divided into three secondary waves. The various quantities involved—the relative strengths of primary and direct currents, the transformer windings and nature and dimensions of the cores—may be selected so as to give as near as possible a sine curve for the final secondary wave L.

The secondary triple periodicity current may be utilized as the primary of a second frequency converter arranged in cascade, two frequency converters only being required to give a ninefold periodicity or three to raise the periodicity twenty seven times. A very high periodicity may therefore be obtained by a few frequency converters in cascade. Or an arrangement such as is shown diagrammatically in Fig. 3 may be used, in which the secondary circuit E is connected to the primary C at M, M' so that the higher frequency secondary E. M. F.'s are superposed upon the primary circuit and a higher order of secondary frequencies is obtainable. The connections between the circuits C and E may be through inductances $m$ and condensers $m'$ tuned to one or more of the multiple frequencies it is desired to select, two inductances and condensers being shown in the illustration, permitting of the selection of two frequencies. In the arrangement shown in Fig. 1 condensers or condensers and inductances may also be employed in series or in shunt with the primary or secondary circuit, for the purpose of tuning and of increasing the efficiency of the arrangement.

I claim:—

1. A frequency changing transformer comprising an unpolarized and two polarized transformer elements, the secondary winding of said unpolarized element being connected in opposition to the secondary windings of said polarized elements.

2. A frequency changing transformer comprising an alternator, an unpolarized element and two polarized elements, all three of these elements being excited by said alternator, and the secondary coil of said unpolarized element being connected in opposition to the secondary windings of said polarized elements.

3. A frequency changing transformer comprising an alternator and three transformer elements excited by said alternator, two of said elements being oppositely polarized by a direct current through their primary coils and the secondary coil of the unpolarized element being connected in opposition to the secondary windings of the polarized elements.

4. A frequency system comprising an alternator, three transformer elements excited by said alternator, a circuit including a direct current generator, two of said elements being provided with coils in said circuit, and the three secondary coils of said transformer being connected in series with one coil in opposition to the other two.

5. A frequency changing system comprising an unpolarized and two polarized transformer elements, the secondary winding of said unpolarized element being connected in opposition to the secondary windings of said polarized elements, said secondary circuit being connected to said primary circuit in such manner that the higher frequency oscillations of said secondary circuit are superposed upon said primary circuit.

In testimony whereof I affix my signature in presence of two witnesses.

TSUNETARO KUJIRAI.

Witnesses:
M. V. KASAWA,
GENJI KURIBARA.